United States Patent [19]

Muenchinger

[11] 3,827,331

[45] Aug. 6, 1974

[54] SELF-EXTRUDING SCREW

[75] Inventor: Herman G. Muenchinger, South Dartmouth, Mass.

[73] Assignee: Research Engineering & Manufacturing, Inc., New Bedford, Mass.

[22] Filed: Nov. 1, 1972

[21] Appl. No.: 302,886

[52] U.S. Cl. .................................................. 85/41
[51] Int. Cl. ............................................ F16b 25/00
[58] Field of Search .......... 85/41, 43, 47; 10/152 R, 10/152 T; 408/223, 224, 225

[56] References Cited
UNITED STATES PATENTS

| 1,643,679 | 9/1927 | Roderick | 408/223 |
| 3,156,152 | 11/1964 | Reed | 85/41 |
| 3,195,156 | 7/1965 | Phipard | 85/47 |
| 3,438,299 | 4/1969 | Gutshall | 85/41 |
| 3,648,560 | 3/1972 | Roser | 85/47 |
| 3,665,801 | 5/1972 | Gutshall | 85/41 |
| 3,724,315 | 4/1973 | Sygnator | 85/47 |
| 3,739,682 | 6/1973 | Siebol et al. | 85/41 |

Primary Examiner—Marion Parsons, Jr.
Attorney, Agent, or Firm—Olson, Trexler, Wolters, Bushnell & Fosse, Ltd.

[57] ABSTRACT

A self-extruding screw comprises a shank with a thread-forming section and a lead section. The thread-forming section may be of arcuate polygonal cross-section. A lead section is adjacent to the thread-forming section and has ribs that are helically disposed opposite to the helix of the thread of the thread-forming section to enlarge, extrude and cold work a pilot hole in a workpiece. The ribs may be eccentric or concentric with respect to the axis of the shank, depending upon whether or not the screw is to be captive with the workpiece. The lead section may also include a drill point to form the pilot hole.

6 Claims, 9 Drawing Figures 3,827,331

SELF-EXTRUDING SCREW

BACKGROUND OF THE INVENTION

This invention relates to improvements in screws of the type that extrude and enlarge a pilot opening in a workpiece for subsequent threading by a thread-forming section of the screw.

One known type of self-threading screw that swages threads in a workpiece without producing chips is disclosed in patent to Phipard, Jr., U.S. Pat. No. 3,195,156, issued July 20, 1965. Broadly speaking, screws of the type therein comprises a shank with a thread of arcuate polygonal cross-section. The thread is characterized by an odd number (usually three) equally spaced lobes having a radius of curvature substantially less than one-half the pitch diameter of the screw, the lobes being separated by relatively broad arcuate sides each having a radius of curvature substantially greater than one-half the pitch diameter of the screw. The sides merge smoothly and continuously with the intervening lobes. The aforesaid arcuate polygonal cross-section is found at the crest, pitch, and root.

In a screw of the foregoing type, a pilot hole of about the pitch diameter of the screw will result in the optimum thread engagement of the workpiece and the screw. The entering end of the screw must be sufficiently small to allow easy entry of the screw prior to formation of the thread. This is ordinarily done by having the width of the tip or dog point of the screw at or near the root or minor diameter of the screw thread. In this regard it should be recognized that the blank from which the screw is roll-threaded is of an arcuate polygonal configuration at the dog point, extending therefrom at least over a portion if not all of the shank.

If a drill point is to be present on the lead end ahead of the lobular thread-forming section of the screw, such drill point could, in theory at least, be lobular whereby a workable size of pilot hole might be drilled. It has been found, however, that a lobular shaped drill point is unsatisfactory because the lobes do not orient themselves properly with the cutting flutes of the drill point with the result that proper concentricity cannot be maintained for effective drilling. Therefore, as a practical matter, the drill point must by cylindrical. With a cylindrical drill point and a lobular dog point on the blank, the maximum diameter of the drill point must fall within the circle that is inscribed within the lobular form. This is much less than the width of the dog point, which is at or near root diameter. Accordingly, the drill point is not capable of drilling a pilot hole of a size which can be directly threaded by the thread-forming section of the screw.

If a swaging structure is provided on the screw intermediate the drill point and the thread-forming section of the screw, the swaging structure should be of a type that enlarges, partially extrudes and cold works the opening without tending to "pick up" or thread the opening. In addition, the swaging structure should be of a configuration that lends itself to embodiment into the screw such that the screw may be designed to be either captive or non-captive with the workpiece. Thus, while a particular screw may be either captive or not captive, the configuration of the swaging section should lend itself to being embodied into either form.

OBJECTS AND SUMMARY OF THE INVENTION

An object of this invention is to provide a screw having a threaded section of a type that forms a thread in a workpiece, and a lead section having a structure for partial extrusion of the opening to provide an enlarged, cold worked, and increased region of engagement and threading by the threaded section.

A further object of the present invention is to provide a screw of a type stated in which the structure for extruding and cold working the workpiece opening performs its intended function without tending to pick up or thread the workpiece.

Yet another object of the present invention is to provide a screw of the type stated that may, if desired, embody a drill point that is adjacent to the extruding and cold working structure whereby the screw is both self-drilling, self-extruding and self-threading.

Another object of the present invention is to provide a screw of the type stated that is particularly useful in forming threaded holes in relatively thin workpieces, such as sheet metal, plastic or the like.

A further object of the present invention is to provide a screw of a type stated in which the extruding and cold working structure may be concentric with the axis of the screw to provide a screw that remains captive with the workpiece, or wherein the extruding and coldworking structure may be made eccentric to the screw axis to obviate a captive condition.

In accordance with the foregoing objects the screw comprises a shank having a threaded section of a type that forms a thread in a workpiece opening. The lead section of the screw has helically disposed ribs with rounded crests for extruding the workpiece opening for subsequent threading by the threaded section. The maximum radial distance from the central axis of the threaded section to the crest of the ribs of the lead section is less than the maximum radial distance from that axis to the crests of the thread. The helical disposition of the ribs is opposite to the helical disposition of the thread and the helix angle of the ribs is substantially greater than the helix angle of the thread. Accordingly, the workpiece opening is extruded without being picked up by the ribs. On the contrary, the ribs tend to push the extruded material forwardly as the screw is advanced into the workpiece.

The helically disposed ribs may be concentric with the central axis of the screw, in which case the screw will remain captive with the workpiece after the threading operation. On the other hand, the ribs may be eccentric to the axis of the screw and of reduced radial width. With eccentric ribs of smaller maximum diameter, extrusion of the workpiece opening nevertheless takes place while at the same time the smaller-diameter ribs permit the screw to be worked out of the workpiece opening, when desired.

The thread on the threading section of the screw may be of the aforesaid described arcuate lobular shape at least adjacent to the lead section. The arcuate polygonal thread configuration may extend for the entire threaded length of the screw as in the case of the aforementioned U.S. Pat. No. 3,195,196. On the other hand, the arcuate polygonal thread configuration of the threading section of the screw may merge into a holding section having circular crest, pitch, and root cross sections as in patent to Muenchinger U.S. Pat. No. 3,681,963, issued Aug. 8, 1972.

DETAILED DESCRIPTION

Figure 1:
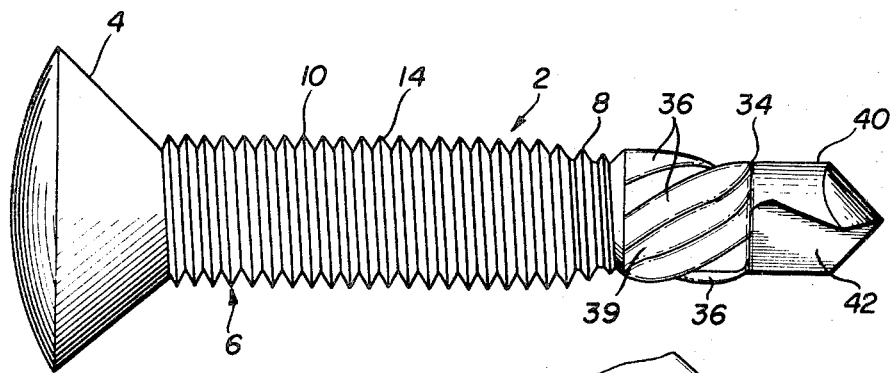
FIG. 1 is a side elevational view of a screw according to this invention.
Figure 2:
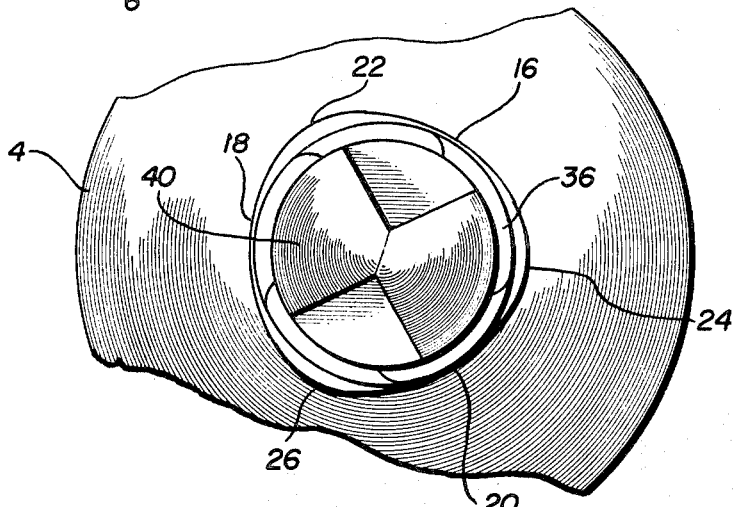
FIG. 2 is a front elevational view thereof.
Figure 3:
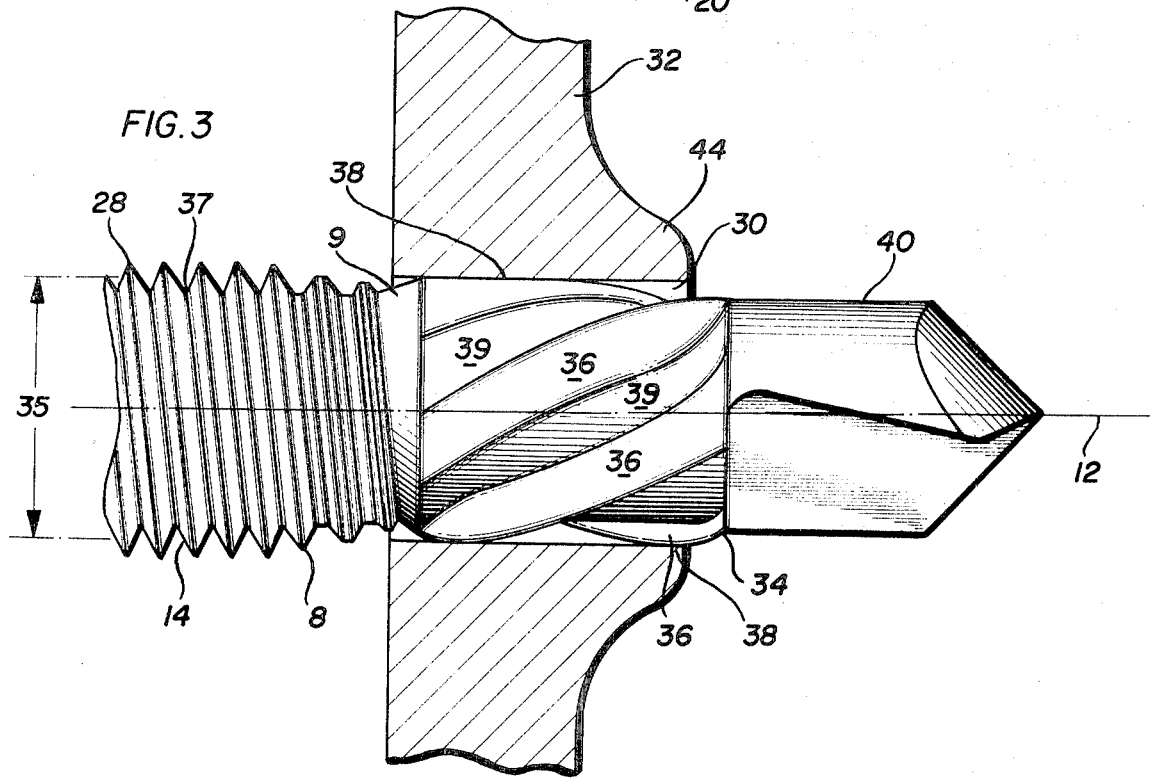
FIG. 3 illustrates a fragmentary portion of the screw of FIG. 1 shown enlarging and extruding a workpiece opening.
Figure 4:
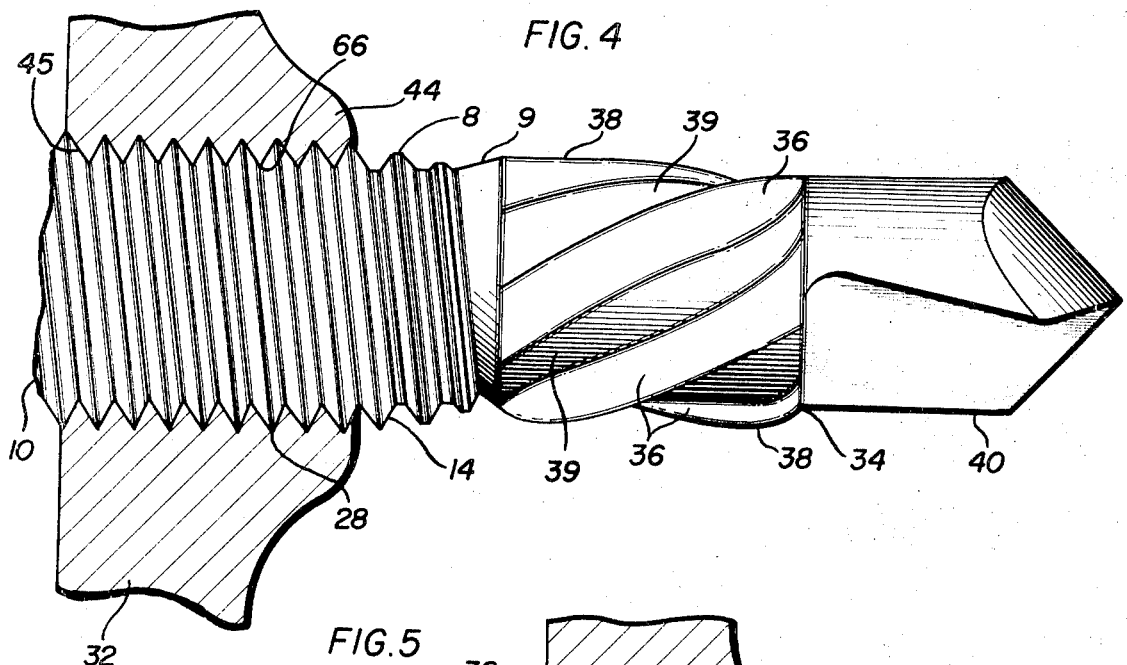
FIG. 4 is similar to FIG. 3 but shows the screw forming the thread in the workpiece opening.

Referring now in more detail to the drawings 2 designates a screw comprising a head 4 and a shank 6. The shank 6 has a thread-forming section 8 that merges with a holding section 10. The thread on the thread-forming and holding sections 8, 10 is a continuous helical thread 14 of known configuration that surrounds the central axis 12 (FIG. 3) of the shank 6.

The thread 14 may be of the type shown in the aforesaid U.S. Pat. No. 3,195,156. Suffice it to say that the crest, pitch and root cross sections of such thread are of arcuate polygonal cross-section. This configuration is, by way of example, characterized by three equally spaced lobes, 22, 24, 26 each having a radius of curvature substantially less than one-half of the pitch diameter of the screw, the lobes being separated by relatively broad arcuate sides 16, 18, 20 each having a radius of curvature substantially greater than one-half of the pitch diameter of the screw. The sides 16, 18, 20 merge smoothly and continuously with the intervening lobes 22, 24, 26, respectively. The lobular cross-sectional configuration of the thread may be the same in both the thread forming section 8 and in the holding section 10. However, if desired the lobulation in the section 8 may progressively diminish to zero in the holding section 10 whereby the crests, pitch and root cross sections in the holding section 10 are circular, as shown and described in the aforesaid U.S. Pat. No. 3,681,963. In either case, however, the thread formation on the thread forming section 8 preferably progressively diminishes in height away from the head 4 and toward the workentering end of the screw. Viewed another way, the radial distance from the axis 12 to the lobes at the thread crest 28 becomes progressively greater in the direction toward the head end of the screw to provide a smooth thread-swaging action in the opening 30 of a workpiece 32.

Adjacent to the forward end of the thread-forming section 8 the shank 6 includes a lead section 34 having a series of helical splines or ribs 36 separated by helical depressions or valleys 39. The splined portion and the section 8 may be joined by a short portion 9. It will be noted that these ribs 36 have a helical disposition that is opposite to the helical disposition of the thread 14. Moreover, the helix angle of the ribs is substantially greater than the helix angle of the thread, and the crest 38 of the ribs are rounded or smooth. Forwardly of the ribs 36 the lead section 34 may also have a drill point 40 of conventional construction and including flutes 42. The drill point is centered on the axis 12.

In a typical screw according to this invention, the maximum or crest diameter of the ribs 36 is approximately the pitch diameter 35 of the thread 14. The pitch diameter is that diameter at which the width of the thread groove is equal to one-half of the basic pitch. The diameter of the drill point is approximately the diameter of the root 37 thread 14, although the drill point diameter may be somewhat less than the thread root diameter. Therefore, when the drill point 40 drills a pilot opening in the workpiece, continued turning of the screw and with axial pressure applied thereto causes the ribs 36 to enlarge, cold work and extrude the opening 30, thereby forming an axial flange 44 that tends to thicken axially the workpiece in the region of the opening 30. Consequently, when the threaded section 8 forms a thread 45 in the workpiece, the resultant thread engagement between the screw and the workpiece will be considerably greater than if no extruded flange 44 had been formed.

It is significant that the helix of the ribs 36 is opposite to that of the thread. This feature causes the ribs to push the workpiece material forwardly and thereby enhance the extruding effect. The tendency to "pick up" the workpiece and form a thread by the crests of the ribs is substantially avoided.

Figure 8:
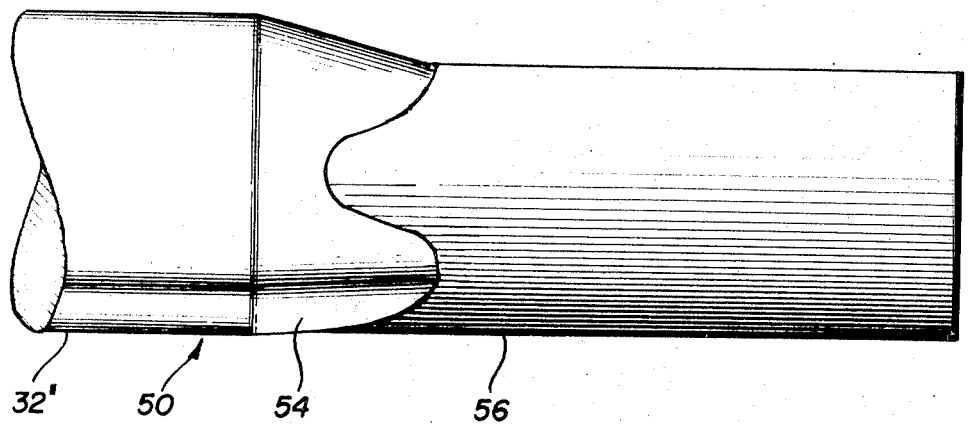
FIG. 8 shows a fragmentary side elevation of the blank used for making the screw of FIGS. 1–3.
Figure 9:
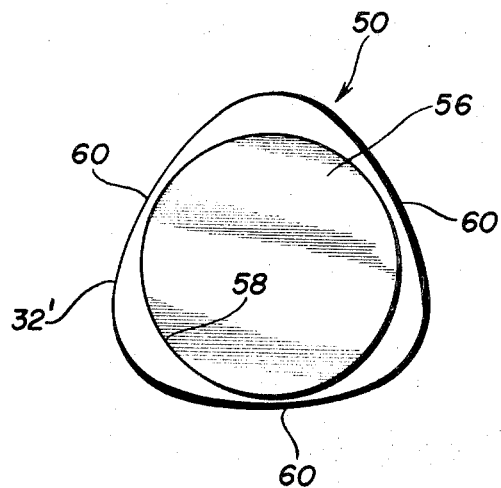
FIG. 9 is a front elevational view of the blank of FIG. 8.

FIGS. 8 and 9 show one type of blank 50 from which the screw is roll-threaded to provide the thread 14 and the ribs 36. The blank has a shank 32' of arcuate polygonal cross section. A portion 54 of the blank is tapered away from the head end thereof and is the region corresponding to the section 8 in the finished screw. The ribs 36 will be rolled and the drill point will be machined on the circular lead section 56 of the blank. The maximum diameter of the lead section 56 of the blank will be the diameter of the largest circle 58 (FIG. 9) that is inscribed within the lobular cross section. Thus, as shown in FIG. 9, this circle will generally be nearly tangent to the long arcuate sides 60, 60, 60 of the lobular portion 54. Thus, the use of a blank that is lobular at the portion 54 results in a limitation on the size of the drill point as compared to what would be a practical possibility in a blank of circular cross-section at the portion 54. Accordingly, the diameter of the drill point is near or less than the root diameter of the thread depending upon the extent of lobulation. However, an adequately sized hole in the workpiece will be formed by the ribs 36.

Figure 5:
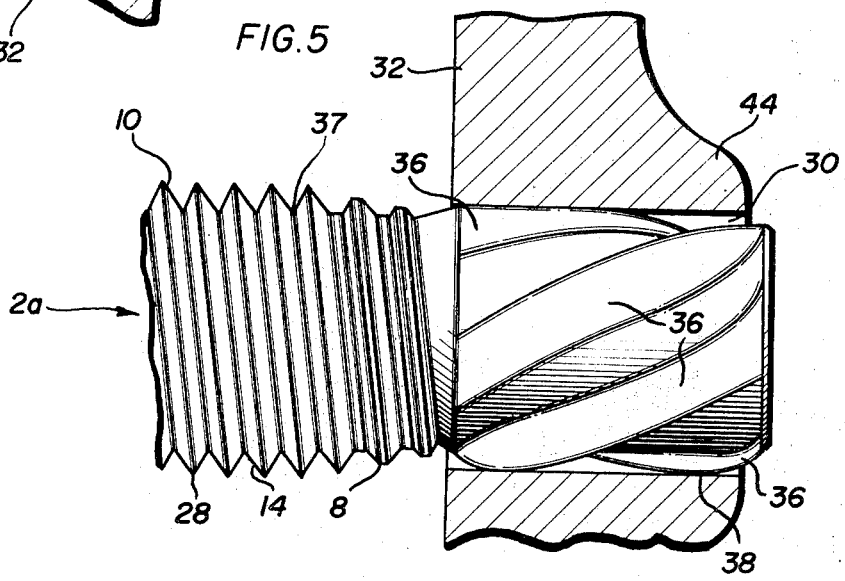
FIG. 5 is a fragmentary side elevation of a modified form of screw shown in a workpiece.

FIG. 5 shows a modified form of a screw 2a which is similar to that previously described. However, in this form of the invention the drill point 40 is eliminated. Instead, a pilot hole of approximately the root diameter is separately drilled in the workpiece. However, the ribs 36 and threading action of the screw operate as heretofore described.

Figure 6:
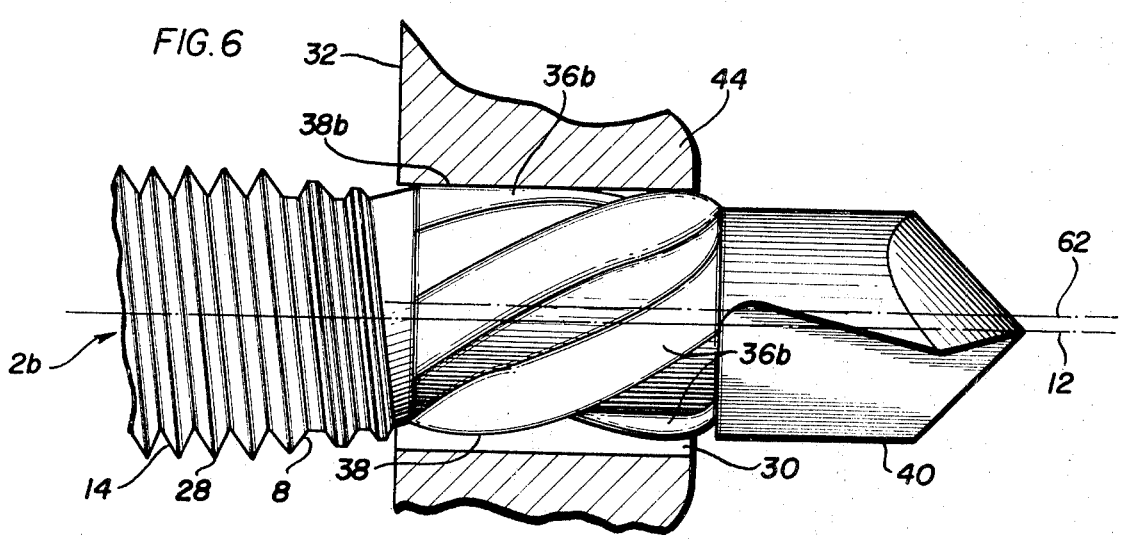
FIG. 6 is a fragmentary side elevation of a further form of screw shown in a workpiece.

In the form of screws shown in FIGS. 1–5, the screws 2, 2a tend to be captive with the workpiece following the threading operation. This is due to the fact that the minimum or crest diameter 66 (FIG. 4) of the thread of the workpiece is less than the crest diameter of the ribs. The captive condition may or may not be desired. However, to avoid the captive condition, the ribs may be eccentric to the thread 14 as shown by the screw 2b in FIG. 6. There the axis 62 of the ribs 36b is eccentric to the central axis 12 while the drill point 40 is centered on the axis 12. In addition, the maximum diameter of the ribs 36b (across the crests 38, 38b) is less than that in the case of the ribs 36. This diameter should be at least slightly less than the anticipated minimum diameter of the thread to be formed in the workpiece. However, the extruding diameter of the ribs 36b is equal to twice the radial distance from the axis 12 to the farthest out or most eccentric crests 38b on the ribs 36b. This extruding diameter can be made to be approximately the pitch diameter of the thread.

Upon withdrawing the screw 2b from the workpiece, the screw can be backed out until the ribs 36b reach the opening 30. At that time the ribs will have a loose engagement with the workpiece opening that permits the screw to be manipulated and worked out of the workpiece.

Figure 7:
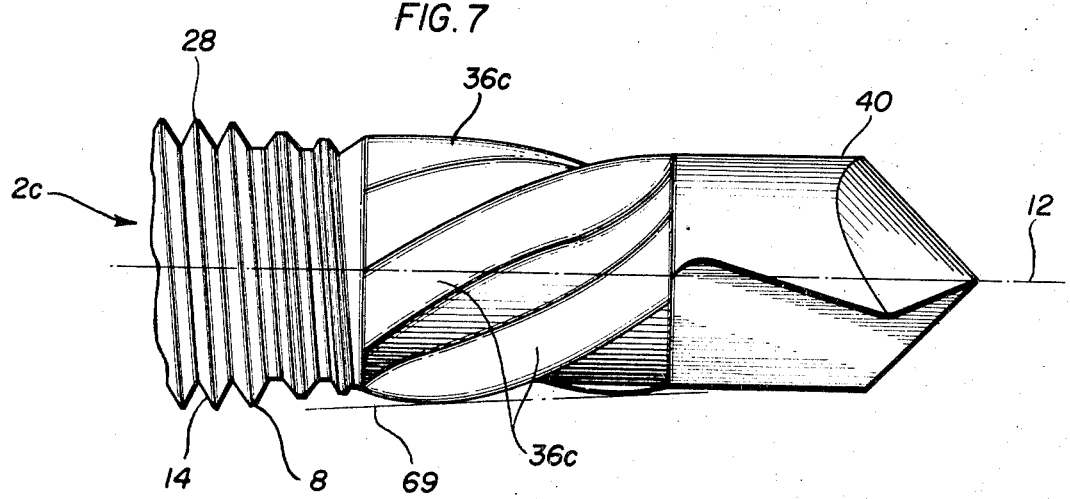
FIG. 7 is a fragmentary side elevation of still another form of screw shown in a workpiece.

FIG. 7 shows a further modified form of screw 2c which differs from those previously described in that the ribs 36c are of progressively decreasing diameter toward the entering end of the screw. Thus, the ribs 36c present a tapered profile (indicated by broken line 69), which is particularly useful in extruding thin workpieces. The tapered profile may, of course, be embodied into the screw with either the eccentric or concentric ribs. Moreover, the drill point 40 may or may not be used in either case, as desired.

The invention is claimed as follows:

1. A screw comprising a shank having a threaded section of a type that forms a thread in a workpiece opening, said threaded section having a central axis, the thread on said threaded section being helically disposed about said axis and including a crest, and a lead section having helically disposed ribs with rounded crests for extruding the workpiece opening for subsequent threading by said threaded section, the maximum radial distance from said axis to the crests of said ribs being less than the maximum radial distance from said axis to the crest of the thread, the helix angle of the ribs being substantially greater than the helix angle of the thread and the helical disposition of said ribs being opposite to the helical disposition of said thread whereby the ribs extrude a flange at the opening in the direction of penetration of the screw into the workpiece substantially without an internal helical deformation therein.

2. A screw according to claim 1 in which the lead section has a central axis that is eccentric to the central axis of the threaded section.

3. A screw according to claim 1 in which the thread on said threaded section has a crest cross section formed by circumferentially spaced lobes joined by arcuate sides, said maximum radial distance from said axis to the crests of said ribs being less than the maximum radial distance from said axis to the crests at said lobes but greater than the minimum radial distance from said axis to the crests at said arcuate sides.

4. A screw according to claim 1 in which the lead section further includes a drill point for forming the opening in the workpiece, said drill point having a radial thickness from said axis that is less than said radial distance from said axis to the crests of said ribs.

5. A screw according to claim 3 in which said lead section includes a drill point for forming an opening in the workpiece, said drill point having a radial thickness from said axis that is less than the minimum radial distance from said axis to an arcuate side.

6. A screw according to claim 1 in which the radial distance of the crests of the ribs from said axis progressively decreases in a direction toward the work-entering end of the screw whereby the ribs present a tapered profile.

* * * * *